United States Patent [19]

West, Jr. et al.

[11] Patent Number: 4,775,997
[45] Date of Patent: * Oct. 4, 1988

[54] SYSTEM FOR INTERFACING A STANDARD TELEPHONE SET WITH A RADIO TRANSCEIVER

[75] Inventors: William L. West, Jr.; James E. Shafer, both of Jackson, Miss.

[73] Assignee: Metrofone, Inc., Skokie, Ill.

[*] Notice: The portion of the term of this patent subsequent to Apr. 14, 2004 has been disclaimed.

[21] Appl. No.: 35,898

[22] Filed: Apr. 8, 1987

Related U.S. Application Data

[63] Continuation of Ser. No. 651,817, Sep. 18, 1984, Pat. No. 4,658,096.

[51] Int. Cl.$^4$ .............................. H01Q 7/04
[52] U.S. Cl. ........................... 379/58; 379/63
[58] Field of Search .................... 379/200, 59

[56] References Cited

U.S. PATENT DOCUMENTS

| | | | |
|---|---|---|---|
| 3,856,982 | 12/1974 | Lawson et al. | 179/90 K |
| 4,122,304 | 10/1978 | Mallien | 179/2 EB |
| 4,234,764 | 11/1980 | Beebe | 379/200 |
| 4,425,480 | 1/1984 | Lischin | 379/200 |
| 4,658,096 | 4/1987 | West, Jr. et al. | 379/59 |

OTHER PUBLICATIONS

Motorola Model Q1372A ITMS Subscriber Unit Instructions Manual; Motorola Engineering Publications; 1973.

E. F. Johnson, 1154 Cellular Mobile Transceiver Service Manual; Jun., 1985.
Glenayre, GL2020 Mobile Telephone Operating Instructions; Glenayre Electronics.
"Notes on the Network" by AT & T Network Planning Division Fundamental Network Planning Section, AT&T, 1980.
"90935/36 Remote and Master Telephone/Radio Interface Modules", Installation & Maintenance Practice, Dantel, Inc., 1981.

Primary Examiner—Robert Lev
Attorney, Agent, or Firm—Milton S. Gerstein; Marvin N. Benn

[57] ABSTRACT

An interface system for interfacing a standard telephone set with a radio transceiver as part of a telephone network is provided. The radio transceiver may be a conventional cellular-type transceiver or other transceiver having typical control inputs and outputs similar to that provided by cellular transceivers. The interface system converts tone-dial or pulse-dial inputs from the telephone into a serial data stream for storage in the transceiver. The interface system automatically determines when the last numeral or digit is dialed and provides a send signal to the transceiver when such determination is made. The system responds to incoming call signals, such as alert signals, from the transceiver and rings the telephone accordingly. The system similates ring and dial-tone type signals under conditions typical of standard telephone set usage.

14 Claims, 7 Drawing Sheets

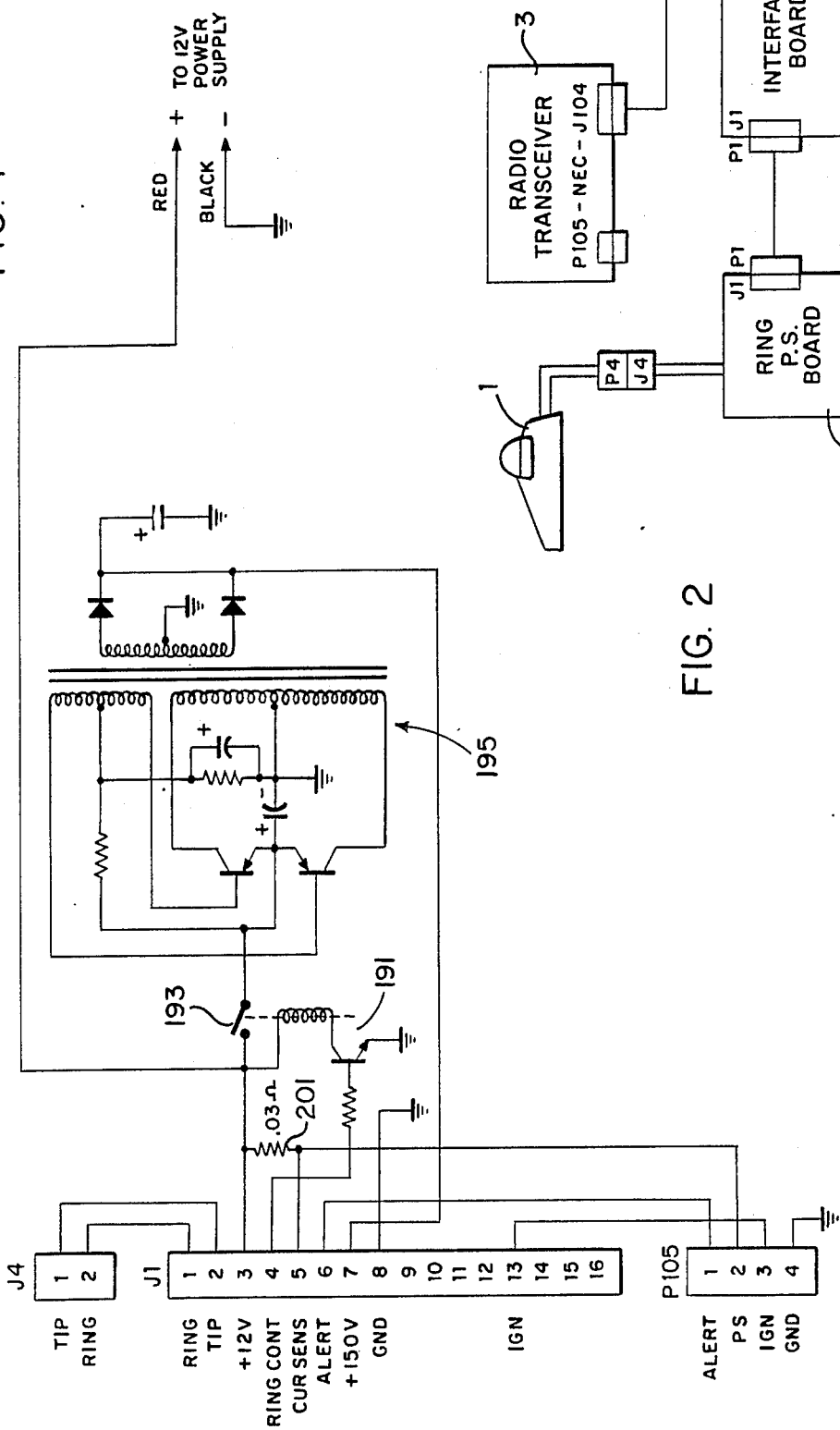
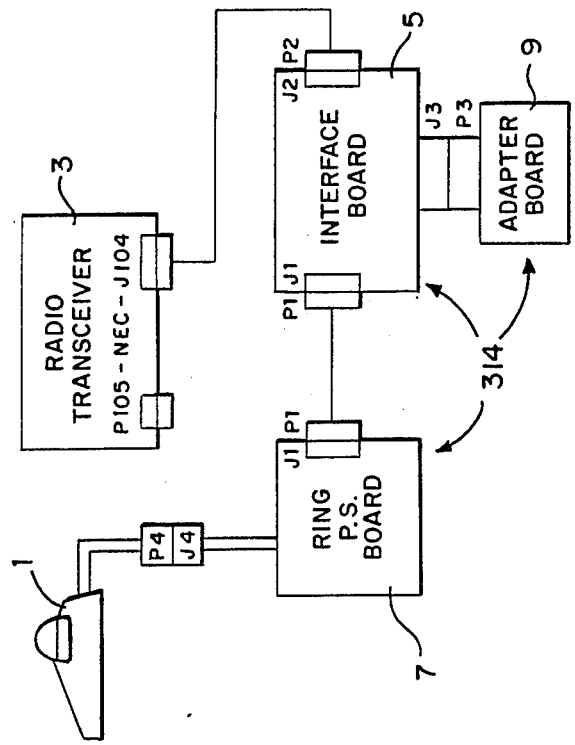
FIG. 4
FIG. 2

SYSTEM FOR INTERFACING A STANDARD TELEPHONE SET WITH A RADIO TRANSCEIVER

This is a continuation of co-pending application Ser. No. 651,817 filed on Sept. 18, 1984, now U.S. Pat. No. 4,658,096.

BACKGROUND OF THE INVENTION

The present invention relates to a system for interfacing a standard telephone set with a radio transceiver that is linked, directly or indirectly, to a local central telephone office in an overall telephone network. In particular, the present invention is adapted to interface the telephone set with a conventional cellular mobile radio transceiver that is part of an existing cellular radio system in the area.

Conventional telephone network systems typically require transmission lines or cables from a local telephone company central office to individual fixed locations, such as a home or an office. The telephone trunk lines entering the fixed location are connected to one or more individual telephone sets, of the touch-tone or pulse-dialing variety, or to a switching unit that may be coupled to a PBX or other type of internal office system network. Conventional telephone network systems suffer from the disadvantage of having to lay costly transmission lines, particularly in areas outside the largest population centers.

Another type of telephone system is the cellular mobile radio telephone system. This system provides for communication between a mobile base station, such as an automobile, and the telephone network. Such cellular radio telephone systems include a plurality of base station transmitter and receiver units carried by the automobile, with computer logic circuitry associated therewith, that provides a radio link with one or more cellular transmitter-receiver stations associated with an 800MC fixed antenna. The cellular receiver-transmitter stations are linked to a computerized central switching center that interfaces with the local telephone network central office. Transmission between the mobile base station transceiver to the cellular station or substation occurs by high speed digital communication.

The base station mobile radio units carried by the automobile typically include a transmitter, a receiver, and computer logic circuitry (hereinafter referred to collectively as the "transceiver") that is mounted in the automobile trunk. The transceiver is connected to a control head that is mounted in the passenger compartment for operation by the user. Typically, the control head includes a microphone, a speaker, and a touch pad for dialing and sending codes to the transceiver to control the transceiver. For example, when a phone number is to be dialled, the user manually inputs the phone number which is then displayed and simultaneously stored in the transceiver memory. The user visually checks to see if the number to be dialed is correct and, if so, activates a SEND button for providing a send code to the transceiver to inform the transceiver that the number stored in its memory is to be digitally transmitted. The numbers to be dialed are then transmitted in a binary data stream for ultimate receipt by the telephone company central office.

The cellular-type transceiver control head interfaces with the trunk-mounted transceiver in a manner totally different from the way a standard telephone set interfaces with the telephone company telephone network. As such, a standard telephone set cannot be coupled with a conventional cellular radio transceiver since the inputs required to control the transceiver, and the transceiver outputs provided to the control head, are simply not compatible with the typical touch-tone/pulse-dialing telephone set.

SUMMARY OF THE INVENTION

The present invention relates to the interfacing of conventional telephone handsets with standard cellular-type radio transceivers. By the interfacing system of the present invention, the telephone set can be used in its conventional and customary manner to dial out and receive telephone calls. Similarly, standard radio transceivers, such as those used in cellular radio systems, can be made compatible with the telephone handset without modification.

By the interfacing system of the present invention, the cellular-type transceiver can be used as a fixed station associated with homes or offices, without requiring any change in the internal home or office telephone network. Telephone service can be provided to such home or office locations by wireless transmission, thus obviating the need for costly telephone transmission line installation. Further, the instant invention would make the installation of radio telephone communication, such as conventional cellular radio telephone systems, practical in less populated areas.

The instant invention can be packaged in a relatively small housing and can be coupled to standard telephones or to an in-house switching network wherein each packaged unit can be associated with what would normally be an incoming telephone trunk line. The unit consists of a standard radio transceiver such as a cellular mobile radio unit. Only the portion that is typically mounted in the trunk is used. This includes the receiver, transmitter, and computer logic circuitry, omitting the control head portion. The system uses a small 800MC gain antenna which can be mounted on the roof of the building. Preferably a small directional antenna, aimed at the existing remote cellular transmitter-receiver antenna can be used. The system further includes a power supply which is designed to produce enough current, at 12 volt DC to operate the radio and the typical functions of the telephone hand set. A rechargeable high current 12 volt battery can be used in the event of a power failure.

The radio transceiver is coupled with conventional telephone sets by a novel interface system. The interface system includes circuitry for simulating typical telephone ring and dial tone signals. When the telephone handset is taken off hook, an internal tone generator within the interface system is coupled across the ring and tip electrodes to generate tones simulating a dial tone. If the system remains off hook for more than a predetermined period of time without any dialing or communication otherwise occurring, the tone generator is pulsed on and off to simulate a reorder tone. When an incoming call is received, characterized by receipt of an alert signal from the transceiver, the interface system provides a ring signal to the telephone set ring circuit. The telephone set then rings in a conventional manner until the set is taken off hook. When taken off hook, the ring circuit is disabled so that ringing stops and a connection to the transceiver is completed.

The interface system of the present invention includes a means for converting the touch tone or pulse dialed numerals, or digits, to digital data for transmission by the transceiver. As each digit is dialed, the touch tone or pulse dialed signals are converted to digital data for storage in the transceiver. After all the digits are dialed, the interface system automatically determines when the last numeral or digit has occurred and provides a SEND coded signal to the transceiver. The transceiver, in response to the SEND code (analogous to a manually pushed button on conventional cellular radio systems), transmits the digital data for ultimate decoding by the local telephone central office to complete the call. When the call is completed, and the handset goes on-hook, an END signal is provided to the transceiver to signify the on-hook condition.

It is thus an object of the present invention to provide a new and unique interfacing system for interfacing a standard telephone set with a wireless radio transceiver typically of the cellular radio-type. Moreover, it is an object of the present invention to make a standard transceiver of the cellular type fully compatible with conventional telephone sets without modification to the transceiver or to the existing cellular network. Thus, an existing radio communication system, such as a cellular radio telephone system, can be integrated with fixed station conventional dialing units.

In particular, it is an object of the interface system of the present invention to convert the touch-tone or pulse-dial digits to digital data for storage in the transceiver and to automatically determined when the last numeral, or digit, has been dialed to thus provide a send signal to the transceiver for ultimate transmission. Still further, it is an object of the present invention to provide an interface system that provides ring and dial tone frequencies, of the proper duration, to the telephone handset so that the handset can be operated in its conventional well known manner.

Still another object of the present invention is to employ the standard cellular type radio transceiver in a fixed location with conventional telephone handsets to provide telephone communication with the fixed location over the existing cellular network, thus avoiding costly wire line transmission systems.

These and other objects of the invention will be apparent when reference is made to the following detailed description and drawings.

BRIEF DESCRIPTION OF THE DRAWINGS

FIG. 2 is an overall block diagram of the interfacing system of the present invention.

FIG. 4 is a schematic of the power supply board of the interface system.

DETAILED DESCRIPTION OF A PREFERRED EMBODIMENT

Figure 1:
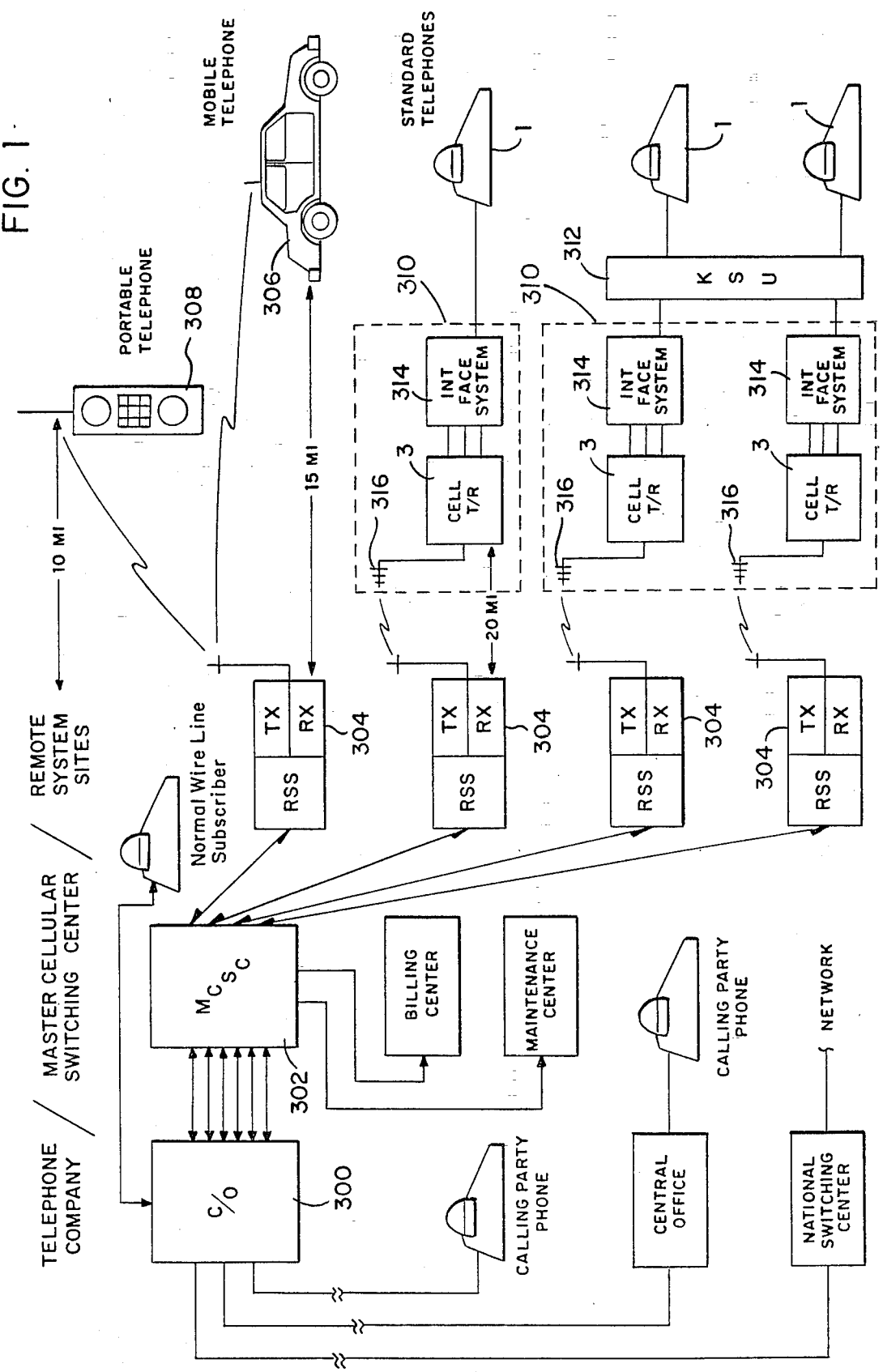
FIG. 1 is an overall block diagram of a typical cellular radio telephone network incorporating the interfacing system of the present invention.

A typical cellular radio telephone network is depicted in FIG. 1. A telephone company central office 300 is coupled with the national switching center network, and various telephones in the local area, including business offices through a business central office. The telephone company central office interfaces with a master cellular switching center 302, which, in turn, interfaces the telephone company central office 300 with various cellular transmitter-receiver station remote system sites 304. These remote system sites are characterized by one or more transmitter and receiver units along with a 150 to 300 foot tower upon which an antenna is mounted. These remote system sites 304 are coupled with the master cellular switching center 302.

A base station receiver and transmitter unit is typically located in the trunk of an automobile 306 and generally consists of a transmitter, a receiver and computer circuitry (hereinafter the "transceiver") to provide a wireless transmission path from the base station mobile unit to the remote system site. Hand held portable cellular telephones 308 can also be used to communicate with the remote system site 304 antennas. In addition to the trunk-mounted transceiver, a control head, not shown, consisting of a specially-designed key pad and display panel, is mounted in the passenger compartment and is cabled with the transceiver.

As depicted generally in FIG. 1, the interface system 314 is provided to couple a standard telephone set 1 of the touch-tone or pulse dial variety with a transceiver 3 such as a standard cellular mobile radio unit transceiver. The transceiver 3 is typically the trunk mounted portion of the normal cellular radio package. This includes the transmitter, the receiver, and associated computer logic circuitry. As seen generally in FIG. 1 the system 310 can be coupled directly to a telephone hand set 1 or to a central switching box 312 typically used in an office environment. In such a system, a separate transceiver 3 and interface system 314 is associated with what would normally be an incoming trunk line. The transceiver 3 is associated with an antenna 316 which may be a small directional 800 mc gain antenna. By using a directional antenna 316, aimed at the nearest remote system site 304, a greater range can be obtained than with the omnidirectional antennas typically used in an automobile-mounted cellular transceiver.

FIG. 2 shows the general layout of the interface system that couples the standard touch tone/pulse dialing telephone set 1 with the radio transceiver 3. In the preferred embodiment, the transceiver 3 is a standard cellular radio transceiver such as the NEC TR5E800-2B. The use of such radio transceiver renders the system operable over the standard cellular radio network as described earlier. It should be noted that other radio transceivers of the cellular-type could be used and modifications, depending upon the particular transceiver characteristics, may be required. Further, the present invention has capability to non-cellular communication systems that may also employ a wireless radio link between a base station and master stations that ultimately are interconnected with the central office of a local or national telephone network. For example, an IMTS transceiver may be used. Further, the transceiver may be part of a compander system as is known in the art. In essence, any radio transceiver that is controlled by inputs (such as SEND signals, etc.) similar to those in cellular transceivers, and that provides outputs similar to the outputs currently provided by cellular transceivers (such as alert signals, etc.) may be used. The transceiver 3 is a similar to the system that is currently installed in an automobile but without the control head which is mounted in the passenger compartment of automobile.

Figure 5:
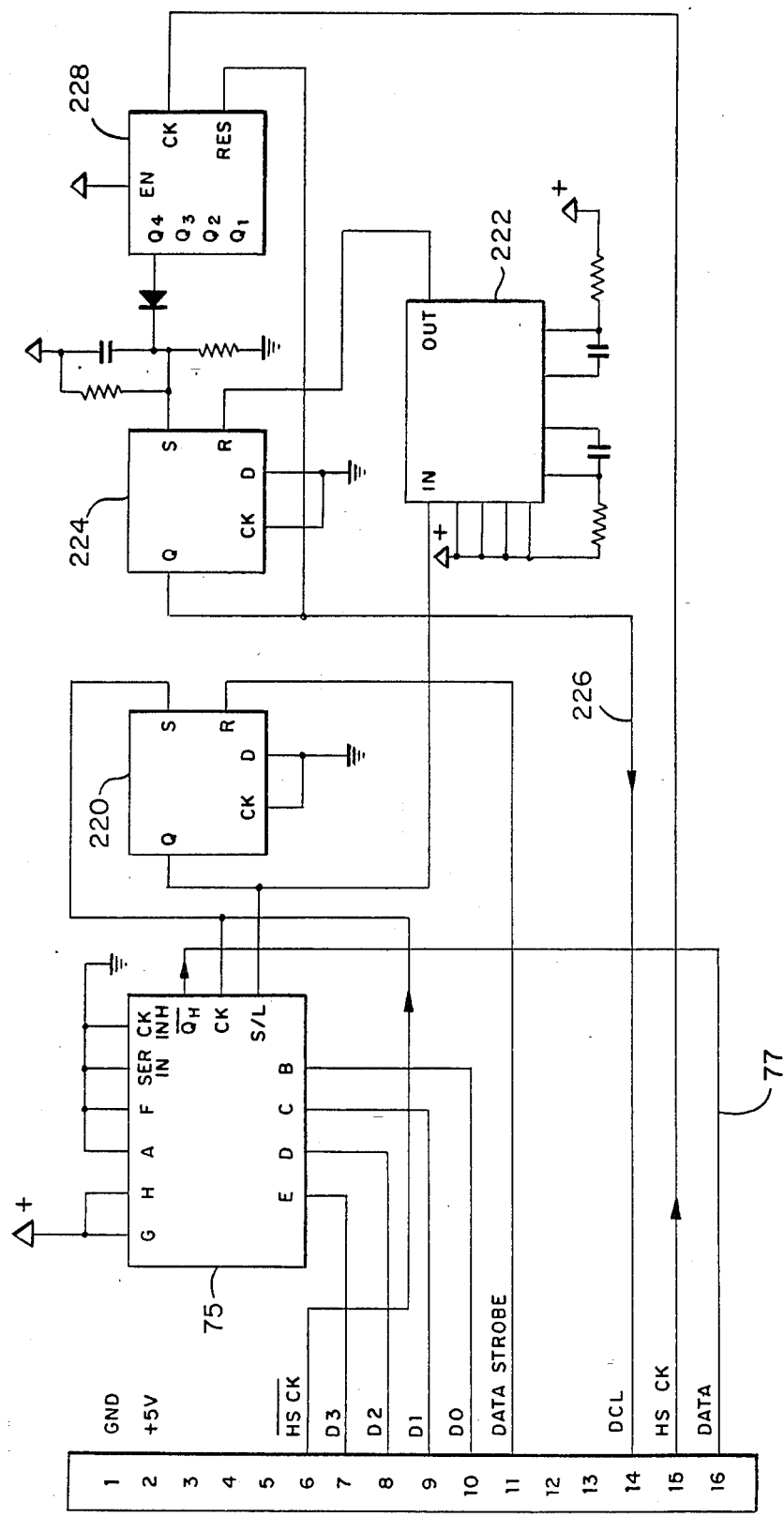
FIG. 5 is a schematic of the adaptor board of the interface system of the present invention.

The telephone set 1 and the radio transceiver 3 are coupled by an interface system 314 that, as disclosed in FIG. 2, includes three printed circuit boards called the interface board 5, the ring power supply board 7 and the adapter board 9. The interface system has been provided on distinct boards for convenience only and, as is apparent to one of ordinary skill in the art, the various functions of each of the boards may be combined in a single board or provided on multiple circuit boards depending upon the convenience of the user. The interface board 5 is depicted in FIGS. 3A-3D, the power supply board 7 is depicted in FIG. 4, and the adapter board 9 is depicted in FIG. 5.

Turning to FIGS. 3A-3D, a telephone, having ring and tip terminals, is connected to the interface board at J1, terminals 1 and 2. When the telephone is taken off hook, loop current flows and energizes the current sensing relay 11. The current sensing relay 11 has its normally open contact connected to a standard touch-tone/rotary dial decoder-converter circuit 13. Circuit element 13 is a Teltone M-948 DTMF receiver, although equivalent converter or decoder circuits could be employed. In particular, the current sensing relay 11 is coupled with the converter circuit 13 through the $\overline{LC}$ pin (which is also used to receive a pulse dialing input). This input also is used to indicate the off hook status which is provided to buffer 15 after an internal delay of approximately 200 msec. The output of buffer 15 turns on transistor 17, which energizes relay 19 to connect the telephone set, through modulation chokes 21,23 to buffer 25. The output of buffer 25 is connected to the SIG IN pin of the converter 13. This provides tone-dialing inputs to the converter circuit 13. Further, the turning on of transistor 17 drives the base of transistor 27 low causing the transistor 27 to conduct. This connects the IGN terminal (J1-13) to a 12 volt level and permits outgoing calls.

Figure 3A:
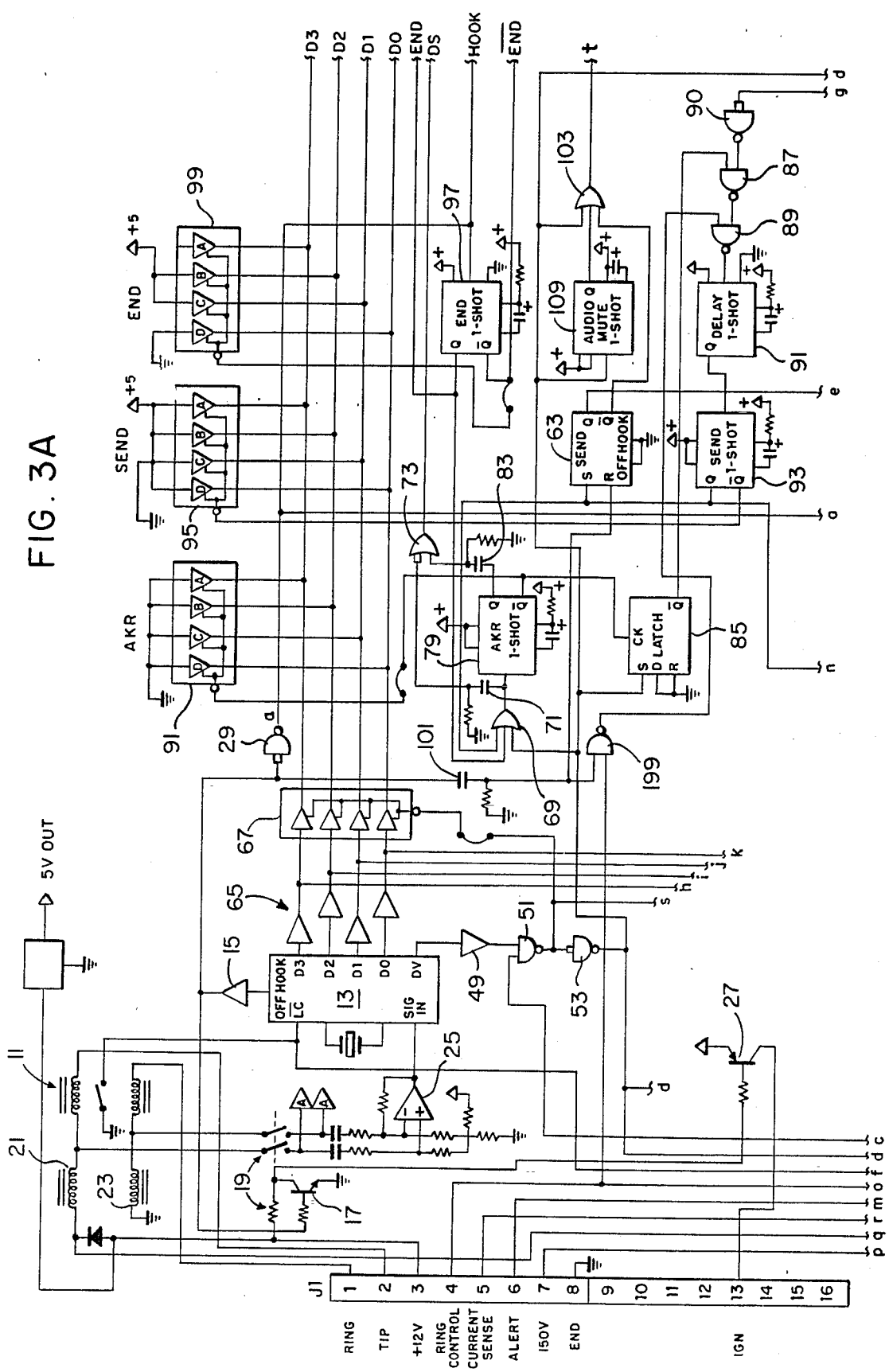
FIGS. 3A-3D are detailed schematics of the interface board portion of the interface system.
Figure 3B:
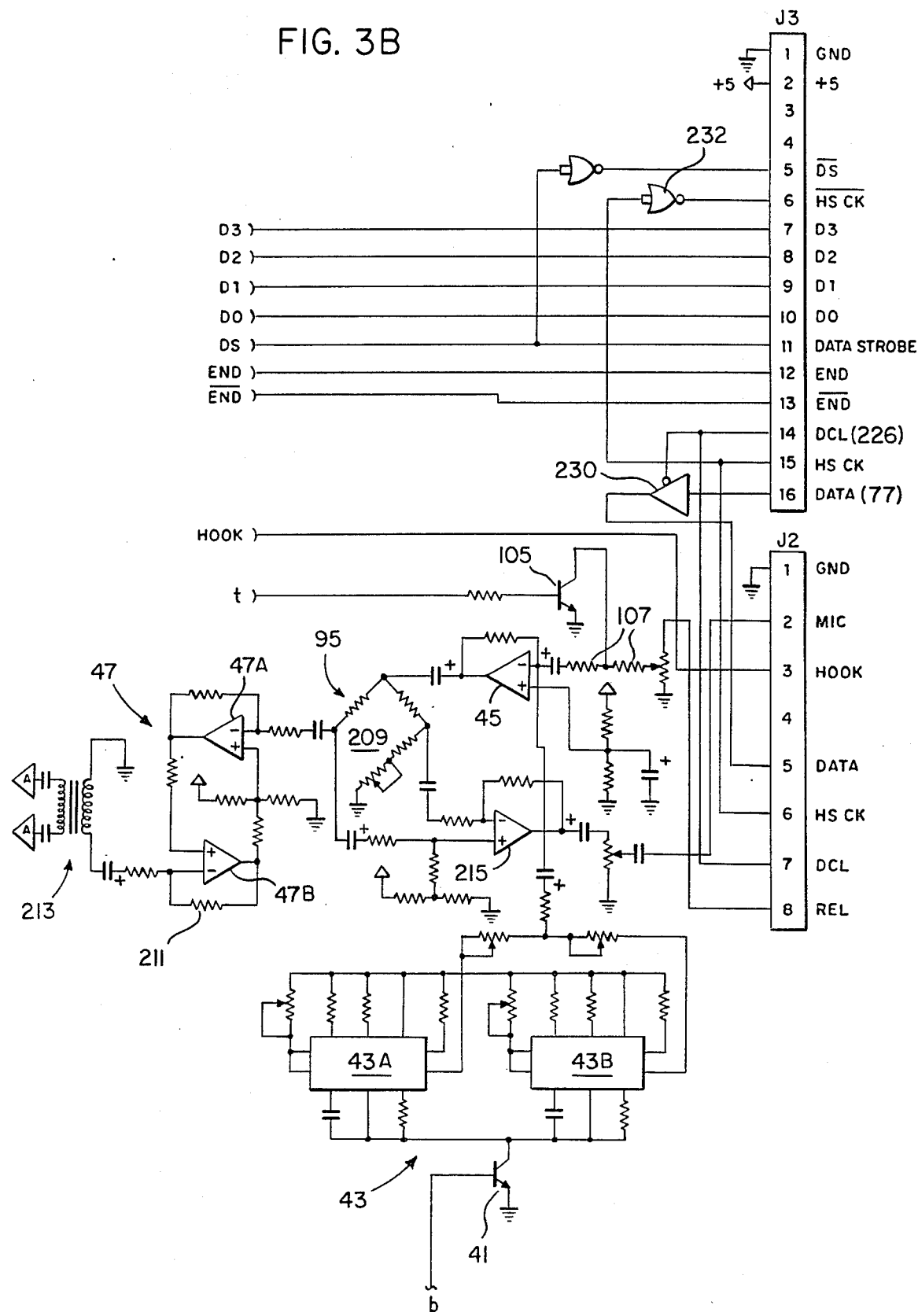
Figure 3C:
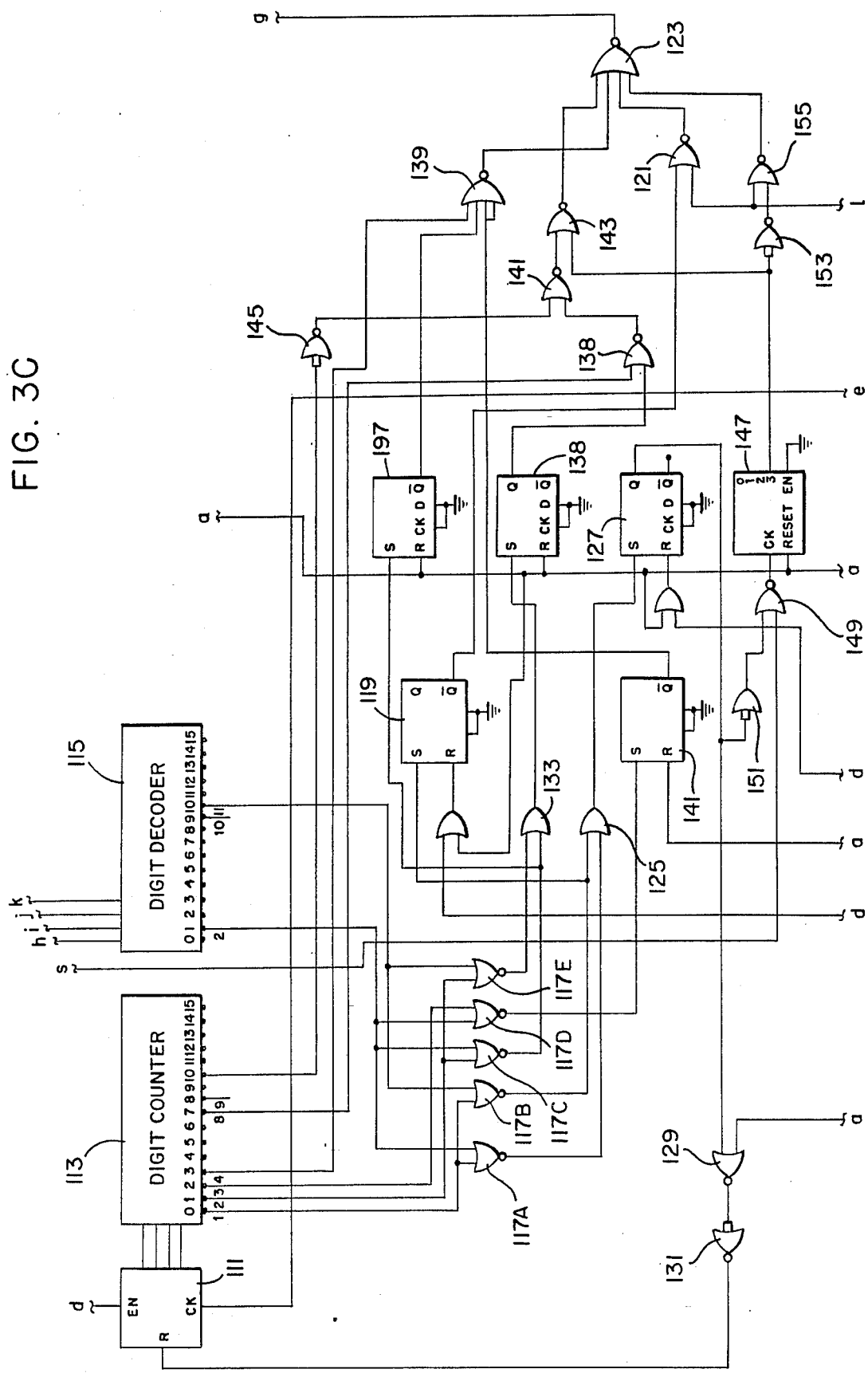
Figure 3D:
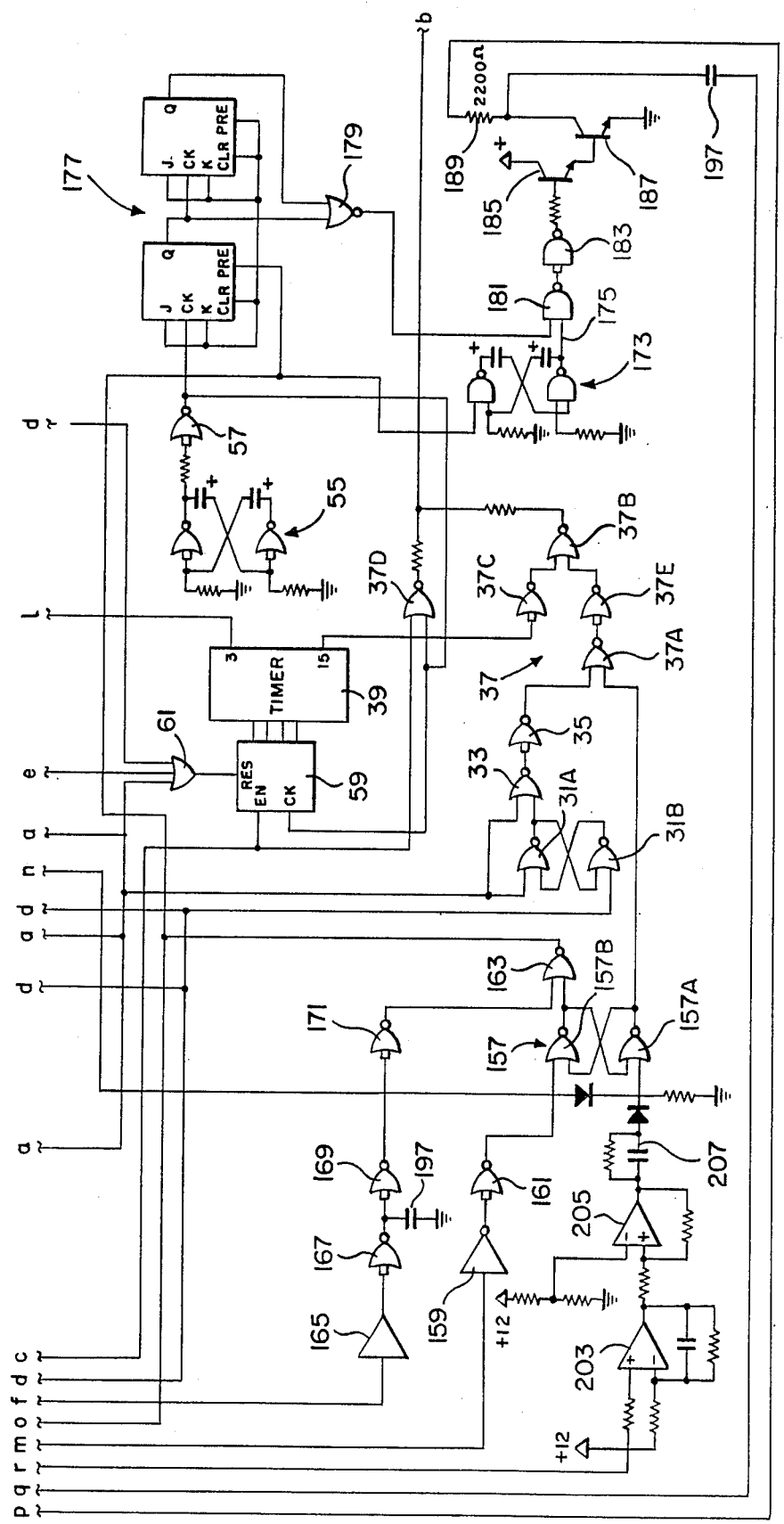

The buffer 15 is also connected to NAND gate 29, which has its output connected to one input of a latch circuit 31 (see. FIG. 3D.) Latch circuit 31 includes NOR gates 31A and 31B. When the telephone handset was last hung-up, the NAND gate 29 (an inverter) had reset the latch 31, leaving the output of the latch 31 low. When the handset was then taken off hook, thus providing a low output at the inverter 29, the low output is connected to an input of NOR gate 33 which takes the output of gate 33 high. Inverter 35, which is connected to the output of gate 33 thus has a low output. The output of inverter 35 is coupled with a series of logical NOR gates 37. Gate 37A has its other input connected with an alert latch circuit 157 to be described. Suffice it to say that the input from latch 157 to 37A is low at this time. Thus, the two low inputs of gate 37A cause the output of gate 37B to be high which turns on transistor 41 (FIG. 3B.) Gate 37B output is high until a timer, consisting of a counter 59 and a decimal decoder (or converter) circuit 39 has counted 15 seconds.

The turning on of transistor 41 provides a ground return path for a dial tone generator 43. The dial tone generator 43 includes a 350 and 440 Hz sinewave generator, 43A and 43B, whose outputs are coupled to the input of a hybrid circuit 95 at amplifier 45. The dial tones are provided through a path from amplifier 45 through the op amp buffer 47 and to terminals A—A which are in turn provided to the telephone via the tip and ring contacts giving a dial tone in the telephone receiver.

As previously mentioned, dialing may be accomplished by either touchtone or rotary dialing depending upon the standard handset available. In either case, the particular telephone numbers that are dialed are decoded by the converter circuit 13. The numerals dialed are converted to a binary coded decimal output which is provided at outputs D3, D2, D1, and D0 of converter 13. For simplicity, only tone dialing will be described hereinbelow, it being recognized by one of ordinary skill in the art that pulse dialing could also be decoded by the circuit 13.

When the touch-tone buttons of the handset are depressed, the tones are provided through buffer 25 and to the SIG IN input of circuit 13. Output DV of converter circuit 13 goes high whenever such dialing occurs (i.e. whenever a handset button is depressed). The output at DV is connected to a buffer 49 and on to a NAND gate 51 which is in turn connected to a NAND gate inverter 53. The other input to gate 51 is from the timer 59,39. This input to gate 51 is high unless the timer 59,39 has counted 15 seconds, in a manner to be described.

The output of inverter 53 is connected to latch circuit 31 (at the input of gate 31B). This sets the latch 31 upon a high output of inverter 53. This high output occurs as soon as a key on the telephone set is pushed and dialing commences. The setting of latch 31 via the NOR gates 37, turns off transistor 41 and thus turns off the dial tone generator 43. Thus, as soon dialing commences, the dial tone generator 43 is turned off.

The interface system also provides for a reorder tone in the event the system stays off hook for more than a predetermined time period. Multivibrator 55 (FIG. 3D) is provided having a one-second period. Multivibrator 55 is coupled through inverter/buffer 57 to a binary counter 59. The binary counter 59 has its output terminals coupled to the decimal converter 39. The reset terminal of the counter 59 is connected with the output of an OR gate 61. The inputs to the OR gate 61 are connected to the output of the inverter 29 (indicating off hook), the inverter 53 (from DV pin of converter 13) and to the output of a SEND flip-flop 63 (described further below). The counter 59 continues to count until reset by any of the three inputs to the OR gate 61. In the event the timer 39,59 counts the 15 seconds during which the phone is off hook and no dialing occurs, the input to gate 51 goes low and its output goes high thus changing the state of the DV inverter 53. Further, the decoder 39 low output is provided to EN input of counter 59 to stop the counter 59. Still, further, the 15 second output of the decoder 39 is provided as inputs to gates 37C and 37D. The output of gate 37C through gate 37B, causes the dialtone generator 43 to be disabled. The output of gate 37D, on the other hand, turns transistor 41 on and off at one second intervals. Thus, a one-second interval dial tone is presented, by the dial tone generator 43, to the amplifier 45, across terminals A—A and to the telephone set. This reorder tone continues until the telephone set is hung up before dialing can be attempted again.

Turning to the dialing function, as each numeral is generated by the telephone handset, and the tones reflecting such numerals are presented to the SIG IN input of converter 13, the tones are decoded to BCD format and provided to terminals D0, D1, D2, and D3 through buffers 65, and to a TRI-STATE buffer 67. As each number, or digit, is dialed, the output of gate 51 goes low and enables the TRI-STATE buffer 67 to connect the data from the converter circuit 13 to the data lines and to junction J3 (FIG. 3B) to the adapter board, FIG. 5. Simultaneously, as each digit is dialed, and the output of DV inverter 53 goes high, the high output from inverter 53 is provided to OR gate 69 to form a positive DATA STROBE pulse that propagates through OR gate 73 to DS terminal J3-11. This DATA STROBE pulse is provided to the adapter circuit, and will be described further below. Suffice it to say for now that each numeral, as dialed, is provided to a shift register 75 on the adapter board wherein the numerical data is converted to serial form and send out over the data line 77 and, ultimately, to the transceiver via terminal J2-5. The serial data, indicative of the numbers to be dialed, is stored in the transceiver in its customary manner for ultimate transmission when a SEND signal is provided.

Separating each numeral that is provided to the transceiver is a particular predetermined code called the ALL KEY RELEASED (AKR) signal. This is provided in the following manner. When a button on a telephone set is released, the DV output of converter 13 goes low which in turn provides a low output from DV inverter 53. (Simultaneously, the output of gate 51 is high which disables the TRI-STATE buffer 67 and disconnects any numerical data from the data lines.) A negative pulse is thus formed at capacitor 71, which triggers a one-shot, called AKR one-shot 79. A 200 msec. duration pulse is provided at the Q output of the AKR one-shot 79. At the same time, the $\bar{Q}$ output goes low and enables the TRI-STATE buffer 81 which connects the predetermined code for AKR stored therein to the data lines. The 200 msec. pulse at the Q output of one-shot 79 is provided through capacitor 83 to OR gate 73 to provide a positive DATA STROBE (DS) pulse at the beginning of the AKR code transmission.

After the proper number of numerals, or digits, are dialed, which is automatically determined in a manner to be described further below, it is necessary to deliver a SEND coded signal over the data lines and ultimately to the transceiver to instruct the transceiver, in its customary manner, to transmit the number dialed, i.e. the numbers stored in its memory. In conventional mobile cellular radio systems, the SEND code is generated manually by the user of the system after he has dialed the proper number of digits and has visually determined that the number is correct. The user then pushes the SEND button which is detected by the transceiver and the information is sent. Since there is no comparable send button on a standard telephone set, the determination of when the send code is to be generated is determined logically as will be described below.

The SEND code is transmitted in the following manner. When a digit is dialed, a DV-AKR latch 85 is set by the output of DV inverter 53. The $\bar{Q}$ output of latch 85 goes low and remains low until the trailing edge of the AKR one-shot pulse clocks the CK input of latch 85. The resetting of the latch 85, after the AKR pulse, causes the $\bar{Q}$ output of latch 85 to go high. This high output is coupled to the input of NAND gate 87.

When the last numeral or digit has been dialed, as determined in a manner to be described below, the input to inverter 90 goes low. The output of inverter 90 goes high and is provided to a second input of inverter 87. The output of inverter 87, after the AKR is sent, thus goes low. Thus, the output of inverter 87 is low after all digits or numerals have been dialed and the last AKR pulse has been triggered.

The output of gate 87 is provided as an input to gate 89. The output of gate 89 thus goes high and triggers a delay one-shot 91. After 200 msec., the Q output of the delay one-shot 91 goes high to trigger a SEND one-shot 93 with its trailing edge. The $\bar{Q}$ output of SEND one-shot 93 enables a TRI-STATE buffer 95 which has a predetermined SEND code encoded therein. Upon triggering of the buffer 95, by the SEND one-shot 93, the predetermined SEND code is provided to the data line. At the same time, the Q output of SEND one-shot 93 is provided as an input to OR gate 69 whose output, through capacitor 71, creates a positive DATA STROBE pulse through OR gate 73 to the DATA STROBE (DS) line at J3, pin 11. This DATA STROBE pulse goes to the adapter circuit board. The trailing edge of the Q output of SEND one-shot 93 triggers the AKR one-shot 79 and provides an AKR code over the data line in a manner as previously described. Similarly, a DATA STROBE pulse is sent, via capacitor 83 at the beginning of the AKR one-shot cycle.

It should be appreciated that the AKR code is sent over the data line, and ultimately to the transceiver, after each piece of information is transmitted. That is, after each numeral is transmitted, after the SEND code is transmitted, etc. This provides a separation for each piece of information so that the transceiver can distinguish the same. This AKR code is not, of course, used for those transceivers that do not include an AKR function. For example, the General Electric transceiver, identified as the "GE STAR", does not require the sending of AKR coded signals between each numeral or send information. With the GE system, the strobe pulse is used as the marker to separate distinct pieces of information.

After the SEND code is provided, followed by the AKR code, if required, the transceiver completes the connection. That is, as is well-known to those skilled in the art, the transceiver transmits in high speed digital fashion, the phone number information for ultimate receipt by the telephone office to permit interconnection with the telephone network and to call the desired party. Once the call is complete, an audio connection between the telephone set and the transceiver is provided via the two to four wire hybrid circuit 95. Full duplex operation occurs. Audio in, from the transceiver is provided over terminal J2 line 8 and audio out to the transceiver is provided through J2, pin 2. It should be apparent that cellular-type transceivers, as is well-known, have a separate audio in and audio out channel. This is in contrast to conventional telephone sets where both the audio in and audio out occurs over a single channel. Thus, the hybrid circuit 95 converts the two channel, four wire connection with the transceiver to a single channel two wire connection, through pins A—A, to the telephone handset.

The audio channel from the transceiver to the interface system is provided over two-wire connections from terminal J2, pins 8 and 1; the audio channel from the interface to the transceiver is provided from terminal J2, pins 1 and 2. Audio from the transceiver passes through amplifier 45, through a bridge circuit 209, and through the op amp buffer 47. In particular, the audio passes through amplifier 47A, the output of which is connected to the input for amplifier 47B. A feedback path from amplifier 47B, through resistor 211, is provided through transformer 213 and across the tip and ring contacts (J1-1,2) via terminals A—A.

The audio channel from the telephone set is provided from the tip and ring contacts (J1-1,2) via terminals A—A, through the transformer 213, and as an input to amplifier 47B. The output of amplifier 47B is provided as an input to amplifier 47A, the output of which is fed back, and to the input of amplifier 215. The audio output of amplifier 215 is provided to the transceiver via terminal J2, pin 2.

After a conversation is completed, and the telephone handset is hungup (placed on hook), an END code is provided over the data lines and to the transceiver to signify the end of a call. This is accomplished as follows. First, the off hook terminal of the converter circuit 13 goes low which provides a high signal at the output of gate 29 (via buffer 15). The high output of gate 29 is provided as an input to END one-shot 97 which triggers a 200 msec. pulse. The $\overline{Q}$ output of the END one-shot 97 enables the TRI-STATE buffer 99 to provide a predetermined END code signal over the data line. The Q output of one-shot 97 is provided through OR gate 69 to cause a positive pulse through capacitor 71 to, in turn, provide a DATA STROBE pulse over the data line as previously described. Upon completion of the END one-shot pulse, the trailing edge of the pulse triggers AKR one-shot to generate an AKR code over the data line as previously described.

It should be noted that during the period of time that a telephone number is being dialed, but prior to the triggering of the SEND code, the telephone handset is off hook. Thus, some means for inhibiting audio that may be coming in from the transceiver is required. Further, after the SEND code is generated, some means is required for inhibiting the reorder tone. This is accomplished in the following manner. When the SEND one-shot 93 is triggered, to cause a SEND code to be provided over the data lines, the SEND one-shot 93 sets a SEND flip-flop latch 63. That is, the Q output of the SEND one-shot 93 is provided as an input to the SEND latch 63. The SEND latch is reset by a pulse generated through capacitor 101 which is coupled to the off hook buffer 15. Thus, when coming off hook, the SEND latch 63 is reset and is set by actuation of the SEND one-shot 93. When set by the SEND one-shot 93, the Q output of latch 63 is provided as an input to OR gate 61 which, in turn, resets the binary counter 59(FIG. 3D.) The binary counter 59 is held reset and prevents further timer operation after the connection is made with the cellular transceiver so that the reorder tone will not occur. It should be noted that prior to the setting of the SEND latch 63, the $\overline{Q}$ output of latch 63 will be high and is provided through OR gate 103 to a transistor 105 (FIG. 3B). The transistor 105 is turned on and provides a ground connection for the pair of resistors 107 to inhibit the transmission of audio from terminal J2, pin 8 through the hybrid circuit 95. Thus, the audio channel from the transceiver is muted until at least a SEND code occurs.

Further, the receiver audio is muted when a telephone key is pressed and for 200 msec. afterward. This is accomplished by the output of DV inverter 53 coupled to an audio mute one-shot 109 and to OR gate 103. Thus, when a key is pressed, the audio is muted for at least 200 msec. thereafter. This muting during key depression is needed when telephone set keys are depressed after an audio connection with the transceiver is made. Frequently, tone generated signals are used as codes to a bank computer, etc. The transceiver is capable of detecting the digits after a SEND code is sent and regenerating and transmitting the tones. Such regeneration tones will also be "heard" over the connected audio channel unless muted.

Let us now consider how the interface system automatically determines when a SEND code is to be provided to the data lines, and hence to the transceiver. That is, we will now consider how the system determines that the proper number of digits has been dialed.

The instant system determines when the last digit, or numeral, of a telephone number has been dialed, and thus when to provide the SEND code to the data line, by looking at various initial digits or numerals of the telephone number and determining if a 0 or 1 is located in these first few digits. A logical analysis is conducted from this information. In order to design a logic to make the proper determination one must know the various combinations of 1s and 0s that are typically used in a telephone network and design the system accordingly. In the present case, for the U.S. phone system, the following logic is designed into the system.

If the first digit or numeral is a 0, and no further numerals are dialed within a certain time (for example three seconds) then a local operator call is assumed and the SEND code is initiated. If the first digit is a 0 or 1, followed by three digits, the latter two of which are 1, or, if only three digits are dialed and the latter two are the numeral 1, then an emergency or information call is assumed. The SEND code then is initiated. If a 1 or 0 is dialed first, then it is assumed that a long distance, including an operator assisted long distance call, such as a credit card call, is being dialed. In such case, seven more digits will be permitted to be dialed before a SEND code is sent. If 1 or 0 is dialed first, and additionally the third digit is 1 or 0, an out of area long distance call is assumed and a total of eleven digits are allowed before a SEND code is sent. If, on the other hand, international dialing is to be accomplished, the international dialing is prefixed by 011. In such case, the SEND code is generated when a three second gap occurs after a digit is dialed. In international dialing, one cannot assume a predetermined number of digits and thus a timing operation has to be relied upon.

The above assumptions, as stated before, are exemplary of the U.S. phone system. In essence, the present invention determines whether the above described conditions are met and, if so, a low signal is provided at the input to gate 90 to thus initiate a SEND code. The logic can be designed according to the particular telephone network in use. In the present case, the determination to trigger the SEND code is made by a hard-wired series of gates and flip-flops that will be described herein. It should be recognized to those of ordinary skill in the art that a microprocessor-based system could also be used wherein the logical decisions are configured in software.

The above-described determinations are accomplished as follows. When a key or button on the telephone set is pushed and then released, the DV inverter output 53 goes from a high to a low state upon the release. This high to low transition from inverter 53 is provided as an input to an enable pin of a counter 111 (See, FIG. 3C.) The counter 111 is advanced on each key release and the four line output of the counter 111 is provided as an input to a binary to decimal converter or decoder 113. The decimal converter 113 provides a discrete output each time the counter 111 is advanced. The counter 111 is advanced each time a digit is dialed, unless the counter 111 is disabled or reset in a manner to be described.

A second decimal digit converter or decoder 115 is provided to receive four inputs from the buffers 65. The decoder 115 decodes the Binary output provided at the buffers 65 to give a decimal value of each digit as it is dialed.

The output of the decoder 113 and decoder 115 are provided to a series of gates 117A-E. NOR gate 117A combines the first number or digit (which is the "0" output of decoder 113 since the count advances with the release of each key) with the digit value 1 of the decoder 115. The output of gate 117A thus is high if and only the first digit dialed is a 1. Similarly, the gates 117B-E decode as follows: Gate 117B will go high if the first digit is a 0; gate 117C will go high if the second digit dialed is a 1; gate 117D will go high if the third digit dialed is a 1; and gate 117E will go high if the second digit dialed is a 0.

If the first digit dialed is a 0, which causes the output of gate 117B to go high, the latch 119 is set. The $\overline{Q}$ output of latch 119 thus goes low. This low output from latch 119 is provided as an input to NOR gate 121. The other input of gate 121 is from timer 39, the three second output thereof. Thus, when timer 39 reaches a count of three seconds after a key is pressed, the timer 39 provides a low signal to the input of gate 121. Thus, gate 121 will have two low inputs and and a high output is provided from the gate 121 as an input to NOR gate 123. The output of gate 123 is thus low which is provided as an input to gate 90, which, in turn, causes the delay one-shot 91 to be triggered, which then triggers the SEND one-shot 93. The SEND code is thus provided to the data lines.

If the first digit to be dialed is a 1 or a 0 as reflected by a high output from gates 117A or 117B, the counter 111 and decimal decoder 113, is not advanced since the counter 111 is reset. That is, if a high output from gates 117A and 117B are provided through NOR gate 125, the latch 127 is set, its Q output goes high to gates 129 and 131 to reset the counter 111. Thus, the first digit is not counted. For example, the dialing 0-911 or 1-911 results in the outputs of decoder 113 and decoder 115 to be the same as dialing 911 without any prefixes.

If the second digit dialed, as determined by the decoder 113 and decoder 115, is 1 or 0, (that is, ignoring the leading 1 or 0 as discussed above) one of the outputs of gates 117C or 117E will be high. This output is provided to OR gate 133, the output of which sets a latch 135. The Q output of latch 135 is provided to NOR gate 138. If the second digit is a 1, thus causing the gate 117C output to go high, latch 137 is set and its $\overline{Q}$ output is provided as an input to NOR gate 139. The output of gate 139 is provided as an input to gate 123.

Similarly, if the third digit is a 1, thus resulting in the output of gate 117D going high, the latch 141 is set causing its $\overline{Q}$ output to go low. The $\overline{Q}$ of latch 141 is provided as an input to gate 139. Thus, if the second and third digits are 1, which causes the $\overline{Q}$ outputs of latches 137 and 141 to go low, when the key is released following the third digit, i.e. the digit decoder 113 terminal 4 goes low, the gate 139 output goes high, the gate 123 goes low and a SEND code is generated in the manner previously described.

If the SEND is not implemented following the third digit, the count from digit decoder 113 continues to advance until the count of 7 is reached. When the count of 7 is reached, the output of decoder 113 at pin 8 is low, which low signal is provided as an input to gate 138. The other input of gate 138 is, as previously mentioned, the Q output of latch 135. Thus, if the latch 135 is not set by detecting a 1 or 0 in the second digit (which indicates an area code), the output of gate 138 goes high. This high output is provided as an input to gate 141 which is, in turn, connected to gate 143. When the output of gate 138 goes high, the output of gate 141 goes low which is provided as an input to gate 143. The other input pin to gate 143 is also low, unless 011 (international dialing) was dialed. Thus, the output of gate 143 goes high triggering a SEND code to be sent via gate 123.

If, on the other hand, latch 135 had been set by a 1 or 0 in a second digit the count advances until the count of ten from the digit decoder 113 is reached. This provides a low output from the 10 position of the digit decoder 113 which is provided as an input to gate 145. In this case, gate 137 inhibited the generation of a SEND on the 7th digit. The output from gate 145 thus goes high and the output of gate 141 goes low. Unless 011 has been dialed the output of gate 143 goes high and in turn causes the output of gate 123 to go low to cause a SEND code to be delivered. This takes care of out of area long distance calls.

Turning next to international dialing, this is prefixed by the digital values 011. These digits are counted by counter 147, which receives its input from gates 149 and 151. The counter 147 counts the number of times the digit counter 111 is reset by a 1 or a 0 in the first digit to be counted. A count of three resets gives a high output to the third count of the counter 147 which provides a high input to gate 153 and 143. The high input provided to gate 143 inhibits the SEND generation on the seventh or tenth digit count. The high input to gate 153 causes the output of gate 153 to go low. The low output of gate 153 is provided as an input to gate 155, the other input of which is connected to timer 39, the three second output thereof. Thus, if 011 is dialed and three seconds elapse with no more digits dialed, the output of gate 155 goes high which is provided as an input of gate 123. The gate 123 output then goes low and a SEND signal is generated as previously described.

Let us now consider how the system is activated to receive an incoming call. Conventional transceivers, such as those used in cellular radio, provide a signal, such as an alert signal, to indicate an incoming call. In the present invention, the interfacing system is used to convert the incoming alert signal to provide a ringing of the telephone handset. This is accomplished in the following manner.

When the telephone set is on hook, the current sensing relay 11 is open to the input pin $\overline{LC}$ of converter circuit 13. This causes the off hook output to buffer 15 to be low and thus the transistor 17 does not conduct and relay 19 remains open. Thus, when the telephone set is ringing, in a manner to be described, the ring voltage is isolated from the SIG IN input of converter 13. Since the transistor 17 is not on (that is, its collector is high), the transistor 27 does not conduct and the transceiver IGN lead at terminal J1-13 is disconnected from the 12 v. supply. This allows the alert signal from the transceiver to function.

The alert line (terminal J1-6) is connected to an alert latch 157 via buffer 159 and inverter 161. During the previous use of the phone, the alert latch 157 had been reset (at gate 157A) by the output from SEND one-shot 93. This provided a high output from gate 157B. The output of the alert latch 157 is coupled to gate 163. The output of gate 163 is coupled with the ring control terminal (at terminal J1, pin 4). The ring control terminal is conncted to the ring power supply circuit in a manner to be described. When the alert latch 157 had been reset by the SEND one-shot 93, the output of gate 163 went low. An incoming signal at alert, terminal J1, pin 3, takes the line to ground (that is, low) and this low signal is passed through the buffer 159 to gate 161 to provide a high output therefrom. This output sets the latch 157, the output of which goes low and this low output is provided as an input to gate 163. The other input of gate 163 is also low since the phone is on hook and there is no loop current. That is, the contact of relay 11 is open and that line, connected to the input of buffer 165, goes high because of internal pull-up in the converter 13. Thus, the input to gate 163 via the gates 167, 169, and 171 goes low. Thus, the output of gate 163 goes high which is provided to the ring control terminal (terminal J1, pin 4).

The output of gate 163 (i.e. the ring control line) when in a high state, enables a 20 Hz multivibrator 173 to produce a 20 Hz square wave at its output terminal 175. The one second clock 55, 57 drives two JK flip-flops 177 to provide a two second and four second square wave respectively. These square waves are combined through OR gate 179 to provide a rectangular wave form of one second on and three seconds off. This wave form is provided to NAND gate 181. The output of gate 181, then, is a 20 HZ square wave which turns on for one second and off for three seconds repetitively. The signal is inverted by inverter 183 which drives transistors 185 and 187 to chop 150 volts DC that is applied through the 2200 ohm resistor 189. The 150 volt DC is provided by a line connected through terminal J1, pin 7 which is connected to the ring power supply board, FIG. 4. Referring to FIG. 4, it is seen that the ring power supply board supplies 150 volts via a transformer coupled to a 12 volt power supply. (Preferably, the 12 volt DC is provided by an AC to DC converter that converts 120 volt AC to the 12 volt DC. A 12 volt DC back-up power supply may also be provided to ensure opeating voltage in the event of a power failure.) The 150 DC is provided by the ring control output signal from gate 163 which is provided as an input (at terminal J1, pin 4 of FIG. 4) which turns on a transistor 191 which in turn, energizes relay 193 which switches on a 12 volt to 150 volt DC transistorized converter circuit 195 to provide the 150 volts through terminal J1, pin 7.

The output from the collector of transistor 187 is coupled to the telephone circuit through capacitor 197 to provide a 150 volt AC 20 Hz ring voltage to the telephone set. This causes a ringing of the telephone. That is, the output of collector 187, through capacitor 197 is provided across the ring and tip terminals (J1, pins 1 and 2) via coil 21, current sensing relay 11 and coil 23.

With the phone ringing, coming off hook causes current sensing relay 11 to close grounding the $\overline{LC}$ pin of converter 13. This grounding, or low, signal is provided as an input to buffer 165 which, through gates 167, 169 and 171, provide a high input to gate 163 and, thus, the output of gate 163, the ring control line, goes low. (The gates 167 and 169, together with capacitor 197 prevent pulsation of current sensing relay 11 due to ring current from disabling the ring control while the phone is ringing and on hook.) Coming off hook while the ring control is high causes two high inputs to gate 199 (FIG. 3A) whose output then goes low. This low pulse is fed as an input to gate 89 causing the output thereof to go high. This fires the delay one-shot 91 which, in turn, fires the SEND one-shot 93, followed by the firing of the AKR one-shot 79, in a manner previously described. Thus, the SEND code signal is provided to the data lines and to the transceiver which thus completes the connection from the transceiver to the telephone central office. At the same time, the firing of SEND one-shot 93 resets the alert latch 157 as earlier described. Thus, the lifting of the handset while the phone is ringing disables the ringing and provides a SEND code to the transceiver to provide a connection with the telephone central office.

After the call is complete and the telephone set is hung up (on hook) an END code followed by an AKR code is provided to the transceiver in a manner previously described.

If the telephone set is not answered during ringing, the ringing will continue until the calling party hangs us. At this point, ringing of the telephone set will cease. This is accomplished in the following manner.

Conventional transceivers of the cellular type draw approximately 3 amps when a call is received (and an alert signal generated). When the calling party hangs up, the transceiver current drops to about 1 amp. This difference in current is sensed and used to control the ringing of the telephone.

In particular, the current drawn by the transceiver is provided to the power supply board (FIG. 4) via terminal P105, pin 2. A resistor 201 having a value of .03 ohms detects the current and an output is provided through current sensing terminal (J1-5). This sensed current is provided as an input to DC amplifier 203 (FIG. 3D), the output of which is provided as an input to comparator 205. The developed voltage amplified by amplifier 203 is applied to comparator 205 to give a high output for a low current and a low output for a high current. When the current drops from high to low the capacitor 207 couples a positive pulse to reset the alert latch 157 when the current drops.

Turning to the adapter board circuitry (FIG. 5), parallel digital data, representing the numerals, or digits, dialed, are provided on the data lines D0–D3 as inputs to the shift register 75. The data is shifted out of the shift register 75 in a serial data stream over DATA line 77 for temporary storage in the transceiver until a SEND code is provided thereto, as previously described. This is accomplished in the following manner.

The inputs from data lines D0–D3 are presented at the E,D,C,B terminals of the shift register 75. The inputs G,H,A, and F are tied in predetermined high and low combinations, as depicted in FIG. 3. These eight inputs are shifted out over line 77.

When a DATA STROBE (DS) pulse is provided from terminal P3, pin 11, i.e., when the DATA STROBE line goes high, the high pulse resets latch circuit 220. The Q output of latch 220 then goes low, which low output is provided to the S/L input of shift register 75 causing the shift register to load the data line inputs from lines D0–D3. The negative edge of the Q output is provided to the input pin of a delay circuit 222. The delay circuit 222 consists of a two one-shot circuits in series. The delay circuit's OUT pin goes high one msec. after the Q output from latch 220 goes low, and the OUT pin stays high for one msec. This high from the OUT pin of delay circuit 222 resets the latch circuit 224, causing the Q output of latch 224 to go low, which sets the DCL (directional control line) line 226 low. The low Q output of latch 224 also disables the reset (RES) of a counter 228.

The low output on the DCL line enables a gate 230 (FIG. 3B) via terminals J3—P3, pin 14. This provides a path for the digital serial data from the shift register 75 to the DATA line of the transceiver (terminal J2, pin 5).

While the DCL line 226 is low, the transceiver (not shown) responds with clock pulses on HSCK line. (This is the normal operating characteristics of NEC transceiver.) That is, clock pulses from the transceiver are provided via terminal J2, pin 6 (FIG. 3B) to terminal J3, pin 15, and to terminal P3, pin 15. Similarly, the HSCK pulses are provided to an inverter 232 (FIG. 3B) and these inverted pulses are provided to terminal J3, pin 6, and then to terminal P3, pin 6 (FIG. 5). These $\overline{HSCK}$ pulses are provided to clock the shift register 75 at the CK pin thereof, and to set the latch 220. The Q output of latch 220 goes high which is provided to the S/L pin of shift register 75. Data is shifted out of the shift register 75 (onto line 77). This shift of data continues until the counter 228 counts eight pulses. At that time, the Q4 output of counter 228 goes high and sets the latch 224, bringing the DCL line (226) high. This sequence is repeated for each eight bit data word.

Above, a specific embodiment of the present invention is disclosed. It should be understood, however, that this description is given for illustrative purposes only and that alterations and modifications may be made without departing from the spirit and scope of the invention which is defined by the appended claims.

We claim:

1. A method of interfacing a telephone communications-type device which is capable of providing a touch-tone/rotary dial-type telephone signal with a radio transceiver used in a telephone communication system wherein the transceiver is capable of radio communication with a remote radio transmitter-receiver system that is part of a telephone network, said method comprising:
   coupling a transceiver to a telephone communications-type device which is capable of providing touch-tone/rotary dial-type telephone signals in order to allow for at least one-way communication between the transceiver and the telephone communications-type device;
   said step of coupling comprising converting each dialed number of the telephone communications-type device into digital data;
   said step of coupling further comprising automatically determining at least the last-dialed number of the telephone number dialed on the telephone communications-type device; and
   sending each digitally-converted number formed by said step of converting to the transceiver for subsequent transmittal.

2. The method according to claim 1, wherein said step of coupling comprises providing two-way communication between the transceiver and the telephone communications-type device.

3. The method according to claim 1, wherein said step of sending comprises storing the digital data in the transceiver memory.

4. The method according to claim 1, wherein said step of coupling further comprises transmitting each digitally-converted number formed by said step of converting, said step of transmitting being carried out in response to said step of automatically determining, whereby, upon the dialing of the last or only number on the telephone communications-type device, the transceiver is actuated to transmit the digital data.

5. The method according to claim 4, wherein said step of automatically determining comprises automatically determining the dialing of a single number representative of a telephone number to be called, and automatically discriminating between a single number that is not a useable number to be called, so that, when the number zero is dialed, said step of transmitting may be carried out, and, for at least one other single-digit telephone number, said step of transmitting is not carried out.

6. The method according to claim 1, wherein said step of automatically determining comprises automatically differentiating between the dialing of a single-digit telephone number and a multi-digit telephone number.

7. The method according to claim 6, wherein said step of automatically differentiating further comprises automatically differentiating between dialing a local telephone number and dialing a long-distance telephone number.

8. The method according to claim 6, wherein step of automatically differentiating further comprises discriminating between dialing a long-distance telephone number and dialing an overseas telephone number.

9. The method of claim 6, wherein said step of automatically differentiating further comprises discriminating between dialing a three-digit telephone number and dialing a seven-digit telephone number.

10. A method of interfacing a telephone communications-type device which is capable of providing touch-tone/rotary dial-type telephone signals with a radio transceiver used in a telephone communication system, wherein the transceiver is capable of radio communication with a remote radio transmitter-receiver system that is part of a telephone network, wherein the method comprises:
    coupling a telephone communications-type device to a coupling means for providing a two-way communication link with the telephone communications-type device;
    coupling to a transceiver a coupling means for providing a two-way communication link with the radio transceiver;
    providing a telephone number digital conversion means for receiving a group of touch-tone or rotary-dialed telephone numbers from the telephone coupling means, said step of providing comprising converting the group of telephone numbers into digital data, and providing the digital data to the transceiver coupling means;
    determining the last digit of the group of telephone numbers provided at the transceiver coupling means;
    providing a send signal to the transceiver;
    detecting an incoming call signal provided at the transceiver coupling means;
    detecting an off-hook signal provided at the telephone coupling means;
    providing a two-way audio signal path between the telephone coupling means and the transceiver coupling means; and
    providing audio frequency ring-tone and dial-tone signals thereto.

11. A method of coupling a telephone communications-type device which is capable of providing touch-tone/rotary dial-type telephone signals with a cellular-type radio transceiver, comprising:
    (a) converting a group of telephone numbers to digital data and providing the digital data to a transceiver;
    (b) automatically determining the last digit dialed in a telephone number;

(c) sending a predetermined send code signal to the transceiver in response to said step (b);
(d) detecting an incoming call from the transceiver; and
(e) generating a ring frequency for providing periodic audio ring-tone frequency signals to said telephone communications-type device.

12. The method according to claim 11, further comprising detecting a hang-up condition from the telephone communications-type device, and sending a predetermined end code signal to the tansceiver in response to detection of the hang-up signal.

13. The method according to claim 11, wherein said step (a) comprises sending a predetermined coded signal to the transceiver upon the completion of each numeral of the group of numerals.

14. A method for coupling a telephone communications-type device which is capable of providing a touch-tone/rotary dial-type telephone signal with a radio transceiver used in a telephone communication system wherein the transceiver is capable of radio communication with a telephone network, wherein the method comprises:
converting a group of telephone numbers to digital data and providing the digital data to a transceiver;
providing a send signal to the transceiver for enabling the transceiver to transmit the digital data;
automatically determining when the send signal is to be provided to the transceiver; and
detecting an incoming call from the transceiver.

* * * * *